US 6,579,998 B2

(12) United States Patent
Sita et al.

(10) Patent No.: US 6,579,998 B2
(45) Date of Patent: Jun. 17, 2003

(54) STEREOSPECIFIC LIVING POLYMERIZATION OF OLEFINS BY A NOVEL ZIEGLER-NATTA CATALYST COMPOSITION

(75) Inventors: Lawrence R. Sita, Silver Spring, MD (US); Kumudini C. Jayaratne, College Park, MD (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 09/849,244

(22) Filed: May 7, 2001

(65) Prior Publication Data

US 2002/0045536 A1 Apr. 18, 2002

Related U.S. Application Data

(63) Continuation-in-part of application No. PCT/US00/00328, filed on Jan. 7, 2000.
(60) Provisional application No. 60/162,037, filed on Oct. 28, 1999.

(51) Int. Cl.[7] .......................... C07F 17/00; B01J 31/00; C08F 4/44

(52) U.S. Cl. .............................. 556/53; 556/11; 556/12; 526/160; 526/943; 502/103; 502/117; 502/152

(58) Field of Search .............................. 556/53, 11, 12; 502/152; 526/160, 943

(56) References Cited

U.S. PATENT DOCUMENTS

| | | | |
|---|---|---|---|
| 5,317,036 A | 5/1994 | Brady, III et al. | 523/223 |
| 5,318,935 A | 6/1994 | Canich et al. | 502/117 |
| 5,527,752 A | 6/1996 | Reichle et al. | 502/117 |
| 5,674,795 A | 10/1997 | Wasserman et al. | 502/9 |
| 5,912,202 A | 6/1999 | Oskam et al. | 502/104 |

OTHER PUBLICATIONS

Asakura, T. et al., "Carbon–13 NMR Spectral Assignment of Five Polyolefins Determined from the Chemical Shift Calculation and the Polymerization Mechanism," *Macromolecules* 24:2334–2340, American Chemical Society (1991).
Asanuma, T. et al., "Preparation of syndiotactic polyolefins by using metallocene catalysts," *Polymer Bull.* 25:567–570, Springer–Verlag (1991).
Babu, G.N. et al., "Microstructure of Poly(1–hexene) Produced by ansa–Zirconocenium Catalysis," *Macromolecules* 27:3383–3388, American Chemical Society (1994).
Baumann, R. et al., "Synthesis of Titanium and Zirconium Complexes That Contain the Tridentate Diamido Ligand, [((t–Bu–d$_6$)N–o–C$_6$H$_4$)$_2$O]$^{2-}$) and the Living Polymerization of 1–Hexene by Activated [NON]ZrMe$_2$," *J. Am. Chem. Soc.* 119:3830–3831, American Chemical Society (1997).
Brintzinger, H.H. et al., "Stereospecific Olefin Polymerization with Chiral Metallocene Catalysts," *Angew. Chem. Int. Ed. Engl.* 34:1143–1170, VCH Verlagsgesellschaft mbH (1995).

Britovsek, G.J.P. et al., "The Search for New–Generation Olefin Polymerization Catalysts: Life beyond Metallocenes," *Angew. Chem. Int. Ed.* 38:428–447, Wiley–VCH Verlag GmbH (Feb. 1999).
Cavallo, L. et al., "Model Catalytic Sites for Olefin Polymerization and Diastereoselectivity in the Cyclopolymerization of 1,5–Hexadiene," *Macromolecules* 26:260–267, American Chemical Society (1993).
Cheng, H.N. and Khasat, N.P., "$^{13}$C–NMR Characterization of Poly(1,5–hexadiene)," *J. Appl. Polymer Sci.* 35:825–829, John Wiley & Sons, Inc. (1988).
Chernega, A.N. et al., "Mono–η–cyclopentadienyl–benzamidinato Compounds of Titanium, Zirconium and Hafnium," *Chem. Commun.* (18) 1415–1417, The Royal Society of Chemistry (1993).
Coates, G.W. and Waymouth, R.M., "Enantiselective Cyclopolymerization: Optically Active Poly(methylene–1,3–cyclopentane)," *J. Am. Chem. Soc.* 113:6270–6271, American Chemical Society (1991).
Coates, G.W. and Waymouth, R.M., "Enantioselective Cyclopolymerization of 1,5–Hexadiene Catalyzed by Chiral Zirconocenes: A Novel Strategy for the Synthesis of Optically Active Polymers with Chirality in the Main Chain," *J. Am. Chem. Soc.* 115:91–98, American Chemical Society (1993).
Coates, G.W. and Waymouth, R.M., "Oscillating Stereocontrol: A Strategy for the Synthesis of Thermoplastic Elastomeric Polypropylene," *Science* 267:217–219, The American Association for the Advancement of Science (1995).
Coughlin, E.B. and Bercaw, J.E., "Iso–Specific Ziegler–Natta Polymerization of α–Olefins with a Single–Component Organoyttrium Catalyst," *J. Am. Chem. Soc.* 114:7606–7607, American Chemical Society (1992).
Doi, Y. et al., "'Living' Coordination Polymerization of Propene with a Highly Active Vanadium–Based Catalyst," *Macromolecules* 19:2896–2900, American Chemical Society (1986).

(List continued on next page.)

Primary Examiner—Porfirio Nazario-Gonzalez
(74) Attorney, Agent, or Firm—Sterne, Kessler, Goldstein & Fox P.L.L.C.

(57) ABSTRACT

An olefin polymerization pre-catalyst and a method for preparing an activated olefin polymerization catalyst composition from the pre-catalyst are disclosed:

(I)

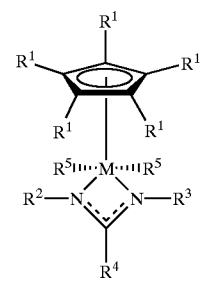

Figure 1A:
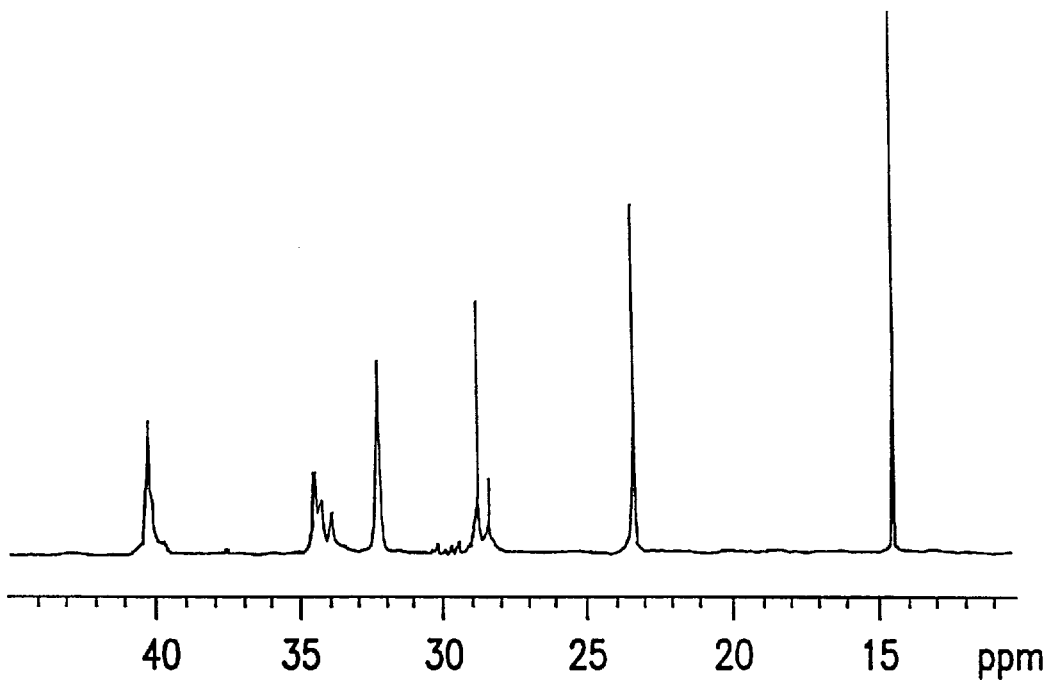

wherein M, $R^1$, $R^2$, $R^3$, $R^4$ and $R^5$ are defined herein.

7 Claims, 3 Drawing Sheets

OTHER PUBLICATIONS

Ewen, J.A., "Symmetrical and Lopsided Zirconocene Pro-Catalysts," *Macromol. Symp.* 89:181–196, Hüthig & Wepf Verlag (1995).

Ewen, J.A., "Symmetry rules and reaction mechanisms of Ziegler–Natta catalysts," *J. Mol. Catalysis A: Chemical* 128:103–109, Elsevier Science B.V. (Feb. 1998).

Gómez, R. et al., "Unexpected Reactions of Pentafluorophenylboron Compounds with η–Cyclopentadienyl (benzamidinato)zirconium Derivatives," *Chem. Commun.* (22) 2607–2608, The Royal Society of Chemistry (1994).

Gómez, R. et al., "Mono–η–cyclopentadienyl–benzamidinato chloro compounds of titanium, zirconium and hafnium," *J. Organomet. Chem.* 491:153–158, Elsevier Science S.A. (1995).

Hagihara, H. et al., "Living Polymerization of Propene and 1–Hexene with the [t–BuNSiMe$_2$Flu]TiMe$_2$/B(C$_6$F$_5$)$_3$ Catalyst," *Macromolecules* 31:3184–3188, American Chemical Society (May 1998), published on the Web Apr. 1998.

Hlatky, G.G. et al., "Ionic, Base–Free Zirconocene Catalysts for Ethylene Polymerization," *J. Am. Chem. Soc.* 111:2728–2729 (1989).

Jayaratne, K.C. and Sita, L.R., "Stereospecific Living Ziegler–Natta Polymerization of 1–Hexene," *J. Am. Chem. Soc.* 122:958–959, American Chemical Society (Feb. 2000), published on the Web Jan. 2000.

Jayaratne, K.C. et al., "Living Ziegler–Natta Cyclopolymerization of Nonconjugated Dienes: New Classes of Microphase–Separated Polyolefin Block Copolymers via a Tandem Polymerization/Cyclopolymerization Strategy," *J. Am. Chem. Soc.* 122:10490–10491, American Chemical Society (Oct. 2000).

Keaton, R.J. et al., "Structural Characterization of Zirconium Cations Derived from a Living Ziegler–Natta Polymerization System: New Insights Regarding Propagation and Termination Pathways for Homogeneous Catalysts," *J. Am. Chem. Soc.* 122:12909–12910, American Chemical Society (Dec. 2000).

Kesti, M.R. and Waymouth, R.M., "Highly Chemo– and Stereoselective Cyclopolymerization of 2–Methyl–1, 5–hexadiene: Chain Transfer via β–CH$_3$ Elimination," *J. Am. Chem. Soc.* 114:3565–3567, American Chemical Society (1992).

Kesti, M.R. et al., "Homogeneous Ziegler–Natta Polymerization of Functionalized Monomers Catalyzed by Cationic Group IV Metallocenes," *J. Am. Chem. Soc.* 114:9679–9680, American Chemical Society (1992).

Killian, C.M. et al., "Living Polymerization of α–Olefins Using Ni$^{II}$–α–Diimine Catalysts. Synthesis of New Block Polymers Based on α–Olefins," *J. Am. Chem. Soc.* 118:11664–11665, American Chemical Society (1996).

Koterwas, L.A. et al., "Stereospecific Syntheses, Metal Configurational Stabilities, and Conformational Analysis of meso– (R,S)– and (R,R)–(η$^5$–C$_5$R$_5$)Ti(CH$_3$)$_2$–N, N'–bis(1–phenylethyl)acetamidinates for R=H and Me," *Organometallics* 18:4183–4190, American Chemical Society (Sep. 1999).

Maciejewski Petoff, J.L. et al., "Elastomeric Polypropylene from Unbridged 2–Arylindenyl Zirconocenes: Modeling Polymerization Behavior Using ansa–Metallocene Analogues," *J. Am. Chem. Soc.* 120:11316–11322, American Chemical Society (Nov. 1998), published on the Web Oct. 1998.

Naga, N. et al., "Cyclopolymerization of 1,7–octadiene with metallocene/methylaluminoxane," *Macromol. Chem. Phys.* 200:1466–1472, Wiley–VCH Verlag GmbH (Jun. 1999).

Resconi, L. and Waymouth, R.M., "Diastereoselectivity in the Homogeneous Cyclopolymerization of 1,5–Hexadiene," *J. Am. Chem. Soc.* 112:4953–4954, American Chemical Society (1990).

Ruiz de Ballasteros, O. et al., "Thermal and Structural Characterization of Poly(methylene–1,3–cyclopentane) Samples of Different Microstructures," *Macromolecules* 28:2383–2388, American Chemical Society (1995).

Schaverien, C.J., "Alkoxides as Ancillary Ligands in Organolanthanide Chemistry: Synthesis of, Reactivity of, and Olefin Polymerization by the μ–Hydride–μ–Alkyl Compounds [Y(C$_5$Me$_5$) (OC$_6$H$_3$$^t$Bu$_2$) ]$_2$ (μ–H) (μ–alkyl)," *Organometallics* 13:69–82, American Chemical Society (1994).

Scollard, J.D. and McConville, D.H., "Living Polymerization of α–Olefins by Chelating Diamide Complexes of Titanium," *J. Am. Chem. Soc.* 118:10008–10009, American Chemical Society (1996).

Sita, L.R. and Babcock, J.R., "Rapid Access to Dimethylcyclopentadienyltitanium(IV) Amidinate, (C$_5$R$_5$)TiMe$_2$ [NR$^1$C (R$^2$)NR$^3$] (R=H and Me; R$^2$=Me), Libraries," *Organometallics* 17:5228–5230, American Chemical Society (Nov. 1998).

Stehling, U.M. et al., "Metallocene/Borate–Catalyzed Copolymerization of 5–N,N–Diisopropylamino–1–pentene with 1–Hexene or 4–Methyl–1–pentene," *Macromolecules* 32:14–20, American Chemical Society (Jan. 1999), published on the Web Dec. 1998.

van der Linden, A. et al., "Polymerization of α–Olefins and Butadiene and Catalytic Cyclotrimerization of 1–Alkynes by a New Class of Group IV Catalysts. Control of Molecular Weight and Polymer Microstructure via Ligand Tuning in Sterically Hindered Chelating Phenoxide Titanium and Zirconium Species," *J. Am. Chem. Soc.* 117:3008–3021, American Chemical Society (1995).

Wolczanski, P.T. and Bercaw, J.E., "Alkyl and Hydride Derivatives of (Pentamethylcyclopentadienyl)zirconium (IV)," *Organometallics* 1:793–799, American Chemical Society (1982).

Yamaguchi, Y. et al., "Stereospecific Polymerization of 1–Hexene Catalyzed by ansa–metallocene/methylaluminoxane Systems under High Pressures," *J. Polymer Sci: Part A: Polymer Chem.* 37:283–292, John Wiley & Sons, Inc. (Jan. 1999).

Yasuda, H. et al., "Synthesis of Monodispersed High Molecular Weight Polymers and Isolation of an Organolanthanide(III) Intermediate Coordinated by a Penultimate Poly(MMA) Unit," *J. Am. Chem. Soc.* 114:4908–4910, American Chemical Society (1992).

STEREOSPECIFIC LIVING POLYMERIZATION OF OLEFINS BY A NOVEL ZIEGLER-NATTA CATALYST COMPOSITION

CROSS-REFERENCE TO RELATED APPLICATIONS

This is a continuation-in-part of PCT/US00/00328 filed Jan. 7, 2000, which claims the benefit of U.S. application No. 60/162,037 filed Oct. 28, 1999, the contents of each of which are fully incorporated by reference herein.

BACKGROUND OF THE INVENTION

1. Field of the Invention

The present invention relates to novel olefin polymerization pre-catalysts which have exhibited the ability to polymerize a variety of α-olefins in a stereospecific and living fashion when activated by a co-catalyst.

2. Background Art

It is well-known that certain aluminum alkyls such as ethylaluminum chlorides form heterogeneous olefin polymerization catalysts in combination with titanium tetrachloride, as is evident from the independent work of Ziegler and Natta. Ziegler, Angew. Chem. 67: 213 (1955); Natta et al., J. Am. Chem. Soc. 77: 1708 (1955). U.S. Pat. No. 2,827,446 to Breslow provides a modified version of those first generation catalysts wherein triethylaluminum was used as the co-catalyst in place of diethylaluminum chloride.

Typical Ziegler-Natta catalysts are all heterogeneous systems, which means that complicated surface phenomena strongly influence the catalyst performance. Many attempts have been made to explain and also to modify the performance of such so-called multiple-site catalysts.

A very early and important approach was that of Natta and Breslow in which each independently used a soluble transition metal compound/aluminum alkyl system in order to study the mechanism of Ziegler-Natta catalysis in homogeneous media. Natta, Chem. Ind 39: 1032 (1957); Breslow et al., J. Am. Chem. Soc. 79: 5073 (1957); Breslow et al., J. Am. Chem. Soc. 81: 81 (1959). It was found that the combination of diethylaluminum chloride and titanocene dichloride resulted in an ethylene polymerization catalyst. However, the activity of this catalyst was found to be much less than the heterogeneous Ziegler-Natta catalysts.

The next milestone of olefin polymerization catalysis was marked by Sinn and Kaminsky, who determined that partly hydrolyzed aluminum alkyls known as aluminoxanes are highly effective co-catalysts for metallocene-type transition metal complexes. In particular, the combination of metallocenes based on zirconium, titanium and hafnium with methyl aluminoxane (MAO) was found to yield much more active polymerization catalysts than the usual heterogeneous Ziegler-Natta catalysts in many olefin polymerization reactions. Sinn et al., Angew. Chem. 92: 39 (1980). Sita and Babcock also describe a combination of titanium amidinates with MAO that was found to yield active polymerization catalysts in the polymerization of ethylene, albeit with lower polymerization activity than with known do group 4 metal complexes. Sita et. al., Organometallics, 17: 5228 (1998).

In addition to their very high polymerization activity, the Kaminsky-Sinn metallocene/methyl aluminoxane catalysts have additional advantageous features which include: (a) access to new polymer modifications in terms of chemical, physical and mechanical properties and (b) access to new polymer structures including specific comonomer incorporation, highly stereoselective polymerization and the reduction of undesirable side-product formation.

Because of these important advantages, metallocene-based "single-site" catalysts have unleashed a technology revolution in industrial olefin polymerization as reflected in the rapidly increasing amount of literature in this field.

Despite the numerous advantages noted above, the particular application of MAO as the co-catalyst for metallocenes introduces some intractable problems with this technology. One such problem is that a considerable excess of methylaluminoxane compared to the amount of metallocene is required in order to get a satisfactory polymerization activity. Typically the transition metal/aluminum molar ratio is between 1:100 and 1:2000. Furthermore, MAO is readily soluble only in aromatic hydrocarbons, and hence these rather unfavorable solvents must be used in any homogeneous polymerization process.

A further complication in the use of MAO arises from the limited shelf-life of methyl-aluminoxane in aromatic hydrocarbons: aging can cause gel formation in such MAO solutions and thus hinder the preparation of homogeneous catalyst systems.

Because of the importance of single-site catalysts, persistent attempts have been made to overcome the MAO-related problems by modifying MAO through incorporation of higher alkyl groups (i.e. isobutyl groups) or supporting the co-catalyst on silica or other inorganic carriers.

Even if these co-catalysts modifications eventually solve most of the above-mentioned problems, other problems may arise in their turn, namely the reduced polymerization activity of MAO modified through incorporation of higher alkyl groups and the insolubility of supported MAO, which restricts its application to slurry and gas-phase processes.

Another approach has been to find a surrogate for MAO by using ionic complexes based on organoboron to convert the metallocene into an active, homogeneous olefin polymerization catalyst. See, e.g., Hlatky et al., J. Am. Chem. Soc. 111:2728–2729 (1989). The main advantage of such systems is that high polymerization activity is achieved at a stoichiometric metallocene/activator ratio of 1:1.

U.S. Pat. No. 5,912,202 discloses a method for preparing an activated catalyst composition which comprises reacting a "single site" catalyst precursor with an activating co-catalyst (e.g., $[PhNMe_2H][B(C_6F_5)_4]$) before, during or after reacting the single site catalyst precursor with a weakly coordinating electron donor such as 1-hexene.

In view of the disadvantages noted in the prior art polymerization catalysts, there is still need for improved, versatile, high-performance olefin polymerization catalysts. In addition, although major advances have been made during the past decade in the development of Ziegler-Natta catalysts that perform either stereospecific (See Brintzinger et al., Angew. Chem. Int. Ed. Engl. 34:1143–1170 (1995); Britovsek et al., Angew. Chem. Int. Ed. Engl. 38:428–447 (1999); Asanuma et al., Polym. Bull. 25:567–570 (1991); Coughlin and Bercaw, J. Am. Chem. Soc. 114:7606–7607 (1992); Kesti et al., J. Am. Chem. Soc. 114:9679–9680 (1992); Babu et al., Macromolecules 27:3383–3388 (1994); van der Linden et al., J. Am. Chem. Soc. 117:3008–3021 (1995); Yamaguchi et al., J. Polym. Sci. A: Polym. Chem. 37:283–292 (1999); Stehling et al., Macromolecules 32:14–20 (1999)) or living polymerization (See Doi et al., Macromolecules 19:2896–2900 (1986); Scollard and McConville, J. Am. Chem. Soc. 118:10008–10009 (1996); Baumann et al., J. Am. Chem. Soc. 119:3830–3831 (1997);

Killian et al., *J. Am. Chem. Soc.* 118:11664–11665 (1996); Hagihara et al., *Macromolecules* 31:3184–3188 (1998); Yasuda et al., *J. Am. Chem. Soc.* 114:4908–4910 (1992)) of α-olefins, there is still a complete lack of highly active homogeneous catalysts that can effect both simultaneously. The present invention relates to a class of transition metal complexes that function as catalyst precursors for the living Ziegler-Natta polymerization of α-olefins upon activation by a borate co-catalyst. More importantly, these transition metal complexes possess the ability to polymerize α-olefins in both a stereospecific and living fashion.

BRIEF SUMMARY OF THE INVENTION

The invention relates to a method for preparing an activated olefin polymerization catalyst composition, which comprises reacting an olefin polymerization pre-catalyst having the Formula (I):

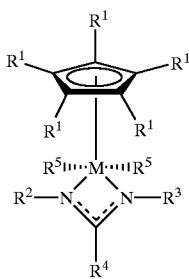

(I)

wherein the dotted lines indicate a delocalized bond;
M is Ti, Zr or Hf;
each $R^1$ is independently hydrogen or alkyl or two adjacent $R^1$ form an aromatic ring;
each $R^2$, $R^3$ and $R^4$ is independently alkyl, cycloalkyl, Si(alkyl)$_3$, Si(aryl)$_3$, optionally substituted Si(aryl)$_3$, optionally substituted phenyl, alkphenyl or optionally substituted alkphenyl; or
one $R^1$ and one of $R^2$, $R^3$ and $R^4$ together form an alkyl, aryl, arylalkyl or alkylarylalkyl bridge; and
each $R^5$ is independently alkyl, cycloalkyl, aryl, optionally substituted aryl, arylalkyl or optionally substituted arylalkyl;
with an activating co-catalyst having the Formula:

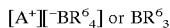

wherein $A^+$ is a cationic Lewis or Brønsted acid capable of abstracting a methyl from the metal, M, of the olefin polymerization pre-catalyst;
B is the element boron; and
$R^6$ is phenyl or optionally substituted phenyl.

The invention further relates to an activated olefin polymerization catalyst composition obtained by the method of the present invention.

The invention further relates to a method for preparing a polyolefin, comprising reacting an α-olefin with the activated olefin polymerization catalyst composition of the present invention under conditions whereby the polyolefin is produced.

The invention further relates to the method for preparing a polyolefin, comprising reacting a diene with the activated olefin polymerization catalyst composition of the present invention under conditions whereby the polyolefin is produced.

The invention further relates to the method for preparing a block co-polymer, comprising reacting a combination of two or more different α-olefins, two or more different dienes or two or more different aromatic compounds having vinyl unsaturation or any combination thereof, with the activated olefin polymerization catalyst composition of the present invention under conditions whereby said block co-polymer is produced. In particular, the invention relates to a method for the preparation of a block co-polymer, comprising reacting an α-olefin and a non-conjugated diene with the activated olefin polymerization catalyst composition of the invention under conditions whereby said block co-polymer is produced.

The invention further relates to the method for preparing a highly isotactic polyolefin, comprising:

(a) preparing an activated olefin polymerization catalyst, which comprises reacting an olefin polymerization pre-catalyst having the Formula (I):

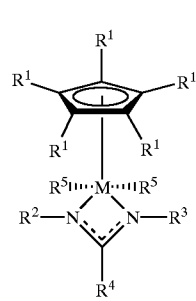

(I)

wherein the dotted lines indicate a delocalized bond;
M is Zr, Ti or Hf;
each $R^1$ is independently hydrogen or alkyl or two adjacent $R^1$ form an aromatic ring;
each $R^2$, $R^3$ and $R^4$ is independently alkyl, cycloalkyl, Si(alkyl)$_3$, Si(aryl)$_3$, optionally substituted Si(aryl)$_3$, phenyl, optionally substituted phenyl, alkphenyl or optionally substituted alkphenyl; or
one $R^1$ and one of $R^2$, $R^3$ and $R^4$ together form an alkyl, aryl, arylalkyl or alkylarylalkyl bridge; and
each $R^5$ is independently alkyl, cycloalkyl, aryl, optionally substituted aryl, arylalkyl or optionally substituted arylalkyl;
with an activating co-catalyst having the Formula:

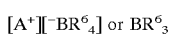

wherein $A^+$ is a cationic Lewis or Brønsted acid capable of abstracting a methyl from the metal, M, of the olefin polymerization pre-catalyst;
B is the element boron; and
$R^6$ is phenyl or an optionally substituted phenyl; and (b) reacting an α-olefin or a combination of two or more unlike α-olefins with the activated olefin polymerization catalyst under conditions whereby said highly isotactic polyolefin is produced.

The invention also relates to the polyolefins, including homopolymers, co-polymers and block co-polymers, made according to the methods of the invention.

The invention also relates to an olefin polymerization pre-catalyst of the Formula (I):

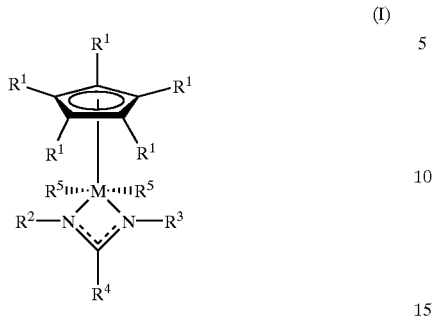

(I)

wherein the dotted lines indicate a delocalized bond;
M is Zr or Hf;
each $R^1$ is independently hydrogen or alkyl or two adjacent $R^1$ form an aromatic ring;
each $R^2$, $R^3$ and $R^4$ is independently alkyl, cycloalkyl, phenyl, optionally substituted phenyl, alkphenyl or optionally substituted alkphenyl;
each $R^5$ is independently alkyl, cycloalkyl, aryl, optionally substituted aryl, arylalkyl or optionally substituted arylalkyl;
with the proviso that $R^2$ and $R^3$ are not the same.

BRIEF DESCRIPTION OF THE DRAWINGS/FIGURES

FIG. 1A shows a $^{13}$C NMR (100 MHZ, CDCl$_3$, 25° C.) spectrum for poly(1-hexene) produced from 1 (See Example 1)/[B(C$_6$F$_5$)$_4$] at 0° C. in chlorobenzene (M$_n$=11,032; M$_w$/M$_n$=1.10).

Figure 1B:
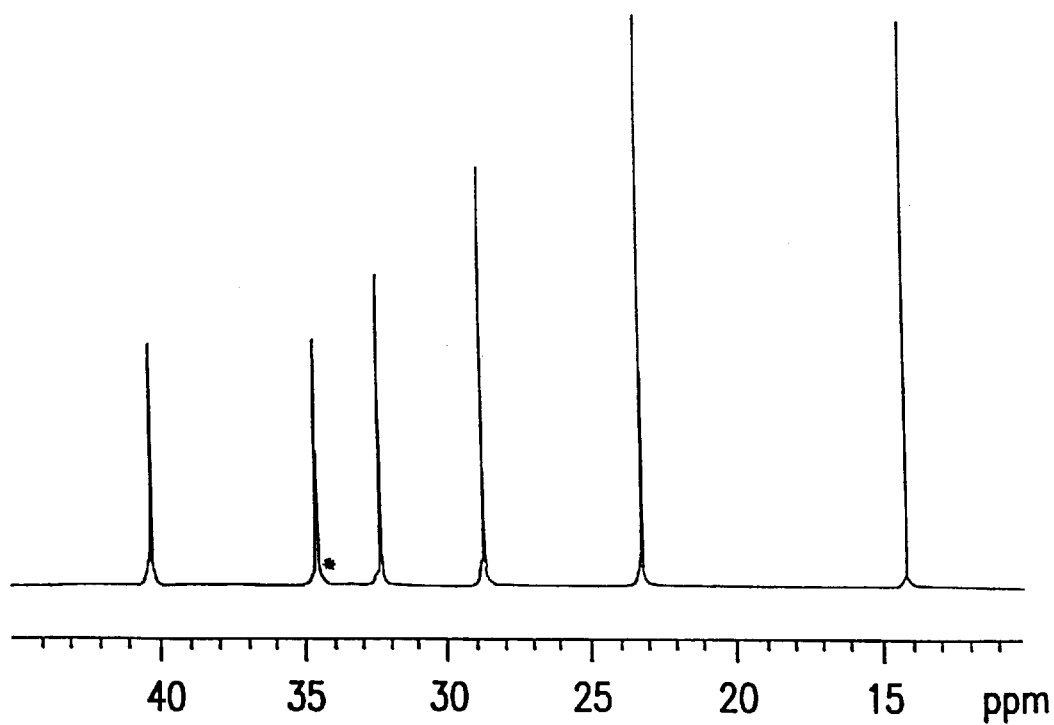

FIG. 1B shows a $^{13}$C NMR (100 MHZ, CDCl$_3$, 25° C.) spectrum (δ40.19, 34.57, 32.33, 28.69, 23.22, 14.19) for poly(1-hexene) produced from 1/[B(C$_6$F$_5$)$_4$]at −10° C. in chlorobenzene (M$_n$=49,251; M$_w$/M$_n$=1.05). The small resonance marked by the asterisk is tentatively assigned to the mmmr pentad (Δδ from mmmm)=−0.21 ppm).

Figure 2A:
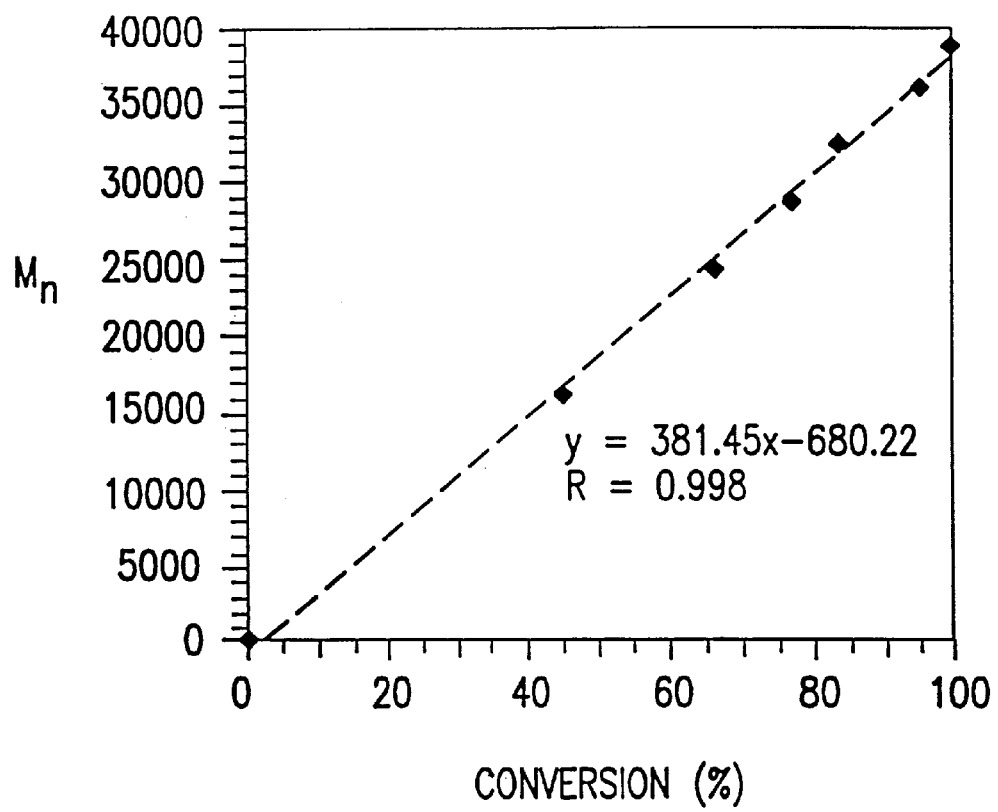
Figure 2B:
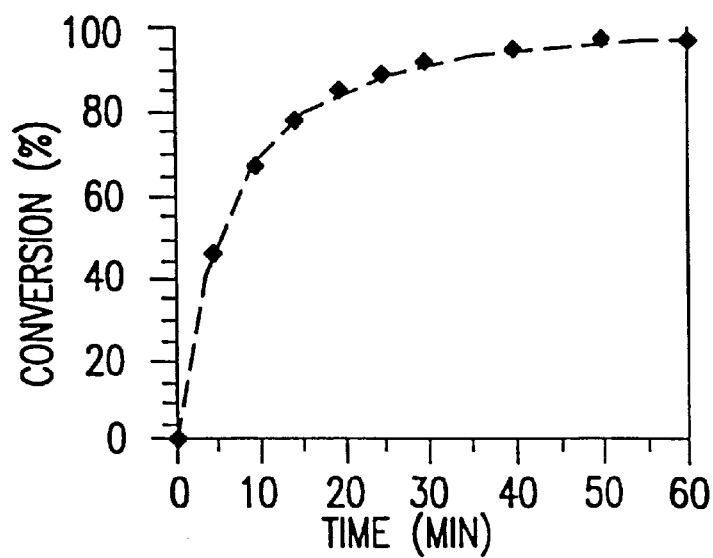

FIG. 2 shows a plot of M$_n$ versus percent conversion of 1-hexene (initial conditions: 1.97 M in 1-hexene; 50 μmol each of 1 and [PhNMe$_2$H][B(C$_6$F$_5$)$_4$] in chlorobenzene, −10° C.; total reaction volume, 10 ml) (M$_w$/M$_n$=1.03–1.09 for each data point). The dashed line is a linear curve fit of the data. The inset shows a plot of the percent conversion of 1-hexene vs. time where the dashed line is a guide for the eye.

Figure 3A:
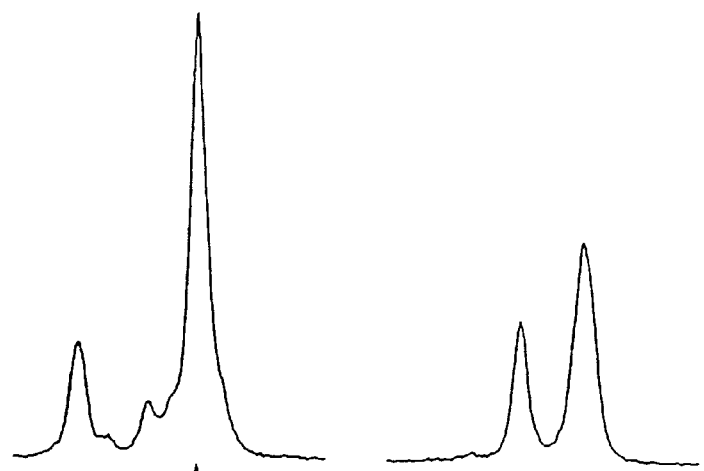
Figure 3B:
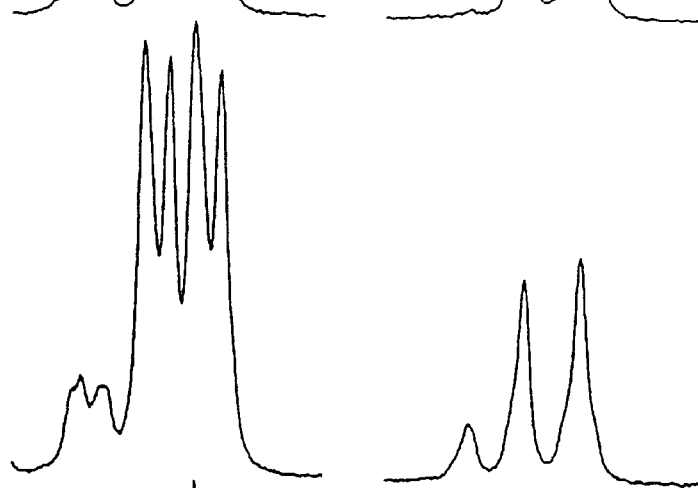
Figure 3C:
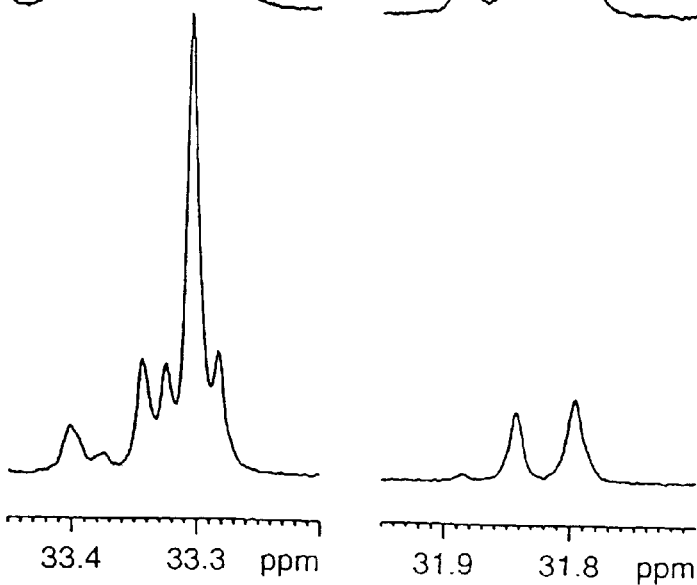

FIGS. 3A–3C depict partial $^{13}$C NMR (125 MHz, chloroform d$_1$, 25° C.) spectra showing the 4,5-trans (δ33.3 ppm) and 4,5-cis resources (δ31.8 ppm) for PMCP prepared using catalysts 1 (FIG. 3A; highly isotactic 3, 2 (FIG. 3B) and 3 (FIG. 3C). (See Example 4.)

DETAILED DESCRIPTION OF THE INVENTION

The present invention relates to a novel olefin polymerization pre-catalyst that is converted to an activated olefin polymerization catalyst upon exposure to an activating co-catalyst. The activated olefin polymerization catalyst promotes the stereospecific living polymerization of α-olefins to provide highly isotactic, high molecular weight materials possessing low polydispersities. The olefin polymerization pre-catalyst may be obtained from an olefin polymerization catalyst precursor.

The invention relates to a method for preparing an activated olefin polymerization catalyst composition, which comprises reacting an olefin polymerization pre-catalyst having the Formula (I):

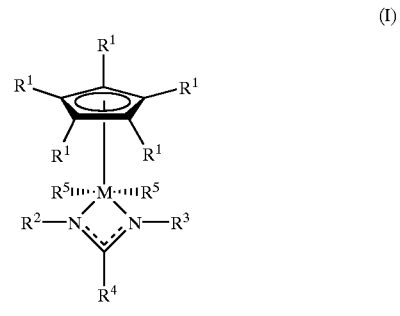

(I)

wherein the dotted lines indicate a delocalized bond;
M is Zr, Ti or Hf;
each $R^1$ is independently hydrogen or alkyl or two adjacent $R^1$ form an aromatic ring;
each $R^2$, $R^3$ and $R^4$ is independently alkyl, cycloalkyl, Si(alkyl)$_3$, Si(aryl)$_3$, optionally substituted Si(aryl)$_3$, phenyl, optionally substituted phenyl, alkphenyl or optionally substituted alkphenyl; or
one $R^1$ and one of $R^2$, $R^3$ and $R^4$ together form an alkyl, aryl, arylalkyl or alkylarylalkyl bridge; and
each $R^5$ is independently alkyl, cycloalkyl, aryl, optionally substituted aryl, arylalkyl or optionally substituted arylalkyl;
with an activating co-catalyst having the Formula:

[A$^+$][$^-$BR$^6_4$] or BR$^6_3$ wherein A$^+$ is a cationic Lewis or Brønsted acid capable of abstracting a methyl from the metal, M, of the olefin polymerization pre-catalyst;
B is the element boron; and
R$^6$ is phenyl or an optionally substituted phenyl.

In a preferred embodiment, M is selected from the group consisting of Zr and Hf; more preferably, M is Zr. Preferably, each $R^1$ is the same and is hydrogen or alkyl; more preferably, each $R^1$ is hydrogen; more preferably, each $R^1$ is methyl. In another preferred embodiment, each $R^2$, $R^3$ and $R^4$ is independently alkyl, cycloalkyl, phenyl, Si(CH$_3$)$_3$, Si(C$_6$H$_5$)$_3$, optionally substituted phenyl, alkphenyl or optionally substituted alkphenyl; more preferably, alkyl, cycloalkyl, phenyl, optionally substituted phenyl, alkphenyl or optionally substituted alkphenyl. Preferably, $R^2$ and $R^3$ are not the same. In another preferred embodiment, one $R^1$ and one of $R^2$, $R^3$ and $R^4$ together form an alkyl, aryl, arylalkyl or alkylarylalkyl bridge; more preferably, an alkyl bridge; most preferably, a trimethylene bridge (i.e., an "ansa-bridge"). Preferably, each $R^5$ is alkyl, cycloalkyl, optionally substituted phenyl or optionally substituted benzyl; more preferably, each $R^5$ is alkyl; most preferably each $R^5$ is methyl. In another preferred embodiment $R^6$ is pentafluorophenyl. Preferably, [A$^+$][$^-$BR$^6_4$] is [PhNMe$_2$H][B(C$_6$F$_5$)$_4$].

A further preferred olefin polymerization catalyst precursor is the trialkyl metallocene (1,2,3,4,5-tetramethyl) cyclopentadienyl trimethyl zirconium. This metallocene may be converted into an olefin polymerization pre-catalyst via reaction with a symmetric or unsymmetric carbodiimide. When this metallocene is used, $R^4$ (vide infra) will always be methyl. However, it is known in the art that other olefin polymerization catalyst precursors may be used which elicit the formation of an olefin polymerization pre-catalyst in which $R^4$ may be other than methyl. See Chernega et al., *J. Chem. Soc. Chem. Commun.*: 1415 (1993). The olefin polymerization pre-catalyst that results from reaction with a unsymmetric carbodiimide is racemic. A preferred olefin polymerization pre-catalyst that results from the reaction of the metallocene with a symmetric (i.e., $R^2=R^3$) or unsymmetric (i.e., $R^2 \neq R^3$) carbodiimide has the Formula (I):

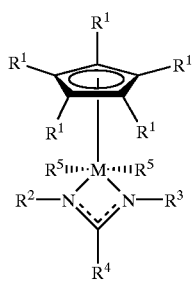

(I)

wherein the dotted lines indicate a delocalized bond;
M is Zr, Ti or Hf;
each $R^1$ is independently hydrogen or alkyl or two adjacent $R^1$ form an aromatic ring;
each $R^2$, $R^3$ and $R^4$ are independently alkyl, cycloalkyl, Si(alkyl)$_3$, Si(aryl)$_3$, optionally substituted Si(aryl)$_3$, phenyl, optionally substituted phenyl, alkphenyl or optionally substituted alkphenyl; or
one $R^1$ and one of $R^2$, $R^3$ and $R^4$ together form an alkyl, aryl, arylalkyl or alkylarylalkyl bridge; and
each $R^5$ is independently alkyl, cycloalkyl, aryl, optionally substituted aryl, arylalkyl or optionally substituted arylalkyl.

The present invention also relates to the method for preparing a block co-polymer, comprising reacting a combination of two or more different α-olefins, two or more different dienes or two or more different aromatic compounds having vinyl unsaturation or any combination thereof, with the activated olefin polymerization catalyst composition of the present invention under conditions whereby said block co-polymer is produced. In particular, the invention relates to a method for the preparation of a block co-polymer, comprising reacting an α-olefin and a non-conjugated diene with the activated olefin polymerization catalyst composition of the invention under conditions whereby said block co-polymer is produced.

The present invention specifically relates to the method for preparing a highly isotactic polyolefin, comprising:
(a) preparing an activated olefin polymerization catalyst, which comprises reacting an olefin polymerization pre-catalyst having the Formula (I):

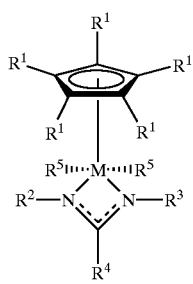

(I)

wherein the dotted lines indicate a delocalized bond;
M is Zr, Ti or Hf;
each $R^1$ is independently hydrogen or alkyl or two adjacent $R^1$ form an aromatic ring;
each $R^2$, $R^3$ and $R^4$ is independently alkyl, cycloalkyl, Si(alkyl)$_3$, Si(aryl)$_3$, optionally substituted Si(aryl)$_3$, phenyl, optionally substituted phenyl, alkphenyl or optionally substituted alkphenyl; or
one $R^1$ and one of $R^2$, $R^3$ and $R^4$ together form an alkyl, aryl, arylalkyl or alkylarylalkyl bridge; and
each $R^5$ is independently alkyl, cycloalkyl, aryl, optionally substituted aryl, arylalkyl or optionally substituted arylalkyl;
with an activating co-catalyst having the Formula:

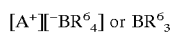

$[A^+][^-BR^6{}_4]$ or $BR^6{}_3$ wherein $A^+$ is a cationic Lewis or Brønsted acid capable of abstracting a methyl from the metal, M, of the olefin polymerization pre-catalyst;
B is the element boron; and
$R^6$ is phenyl or optionally substituted phenyl; and
(b) reacting an α-olefin or a combination of two or more unlike α-olefins with the activated olefin polymerization catalyst under conditions whereby said highly isotactic polyolefin, co-polymer or block co-polymer is produced.

In a preferred embodiment, M is selected from the group consisting of Zr and Hf; more preferably, M is Zr. Preferably, each $R^1$ is the same and is hydrogen or alkyl; more preferably, each $R^1$ is hydrogen; more preferably, each $R^1$ is methyl. In another preferred embodiment, each $R^2$, $R^3$ and $R^4$ is independently alkyl, cycloalkyl, Si(CH$_3$)$_3$, Si(C$_6$H$_5$)$_3$, phenyl, optionally substituted phenyl, alkphenyl or optionally substituted alkphenyl; more preferably, alkyl, cycloalkyl, phenyl, optionally substituted phenyl, alkphenyl or optionally substituted alkphenyl. Preferably, $R^2$ and $R^3$ are not the same. In another preferred embodiment, one $R^1$ and one of $R^2$, $R^3$ and $R^4$ together form an alkyl, aryl, arylalkyl or alkylarylalkyl bridge; more preferably, an alkyl bridge; most preferably, a trimethylene bridge (i.e., an "ansa-bridge"). Preferably, each $R^5$ is alkyl, cycloalkyl, optionally substituted phenyl or optionally substituted benzyl; more preferably, each $R^5$ is alkyl; most preferably, each $R^5$ is methyl. In another preferred embodiment, $R^6$ is pentafluorophenyl. Preferably, $[A^+][^-BR^6{}_4]$ is [PhNMe$_2$H][B(C$_6$F$_5$)$_4$].

The invention also relates to an olefin polymerization pre-catalyst of the Formula (I):

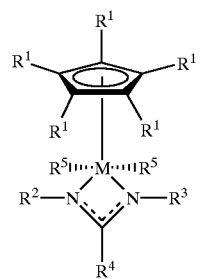

(I)

wherein the dotted lines indicate a delocalized bond;

M is Zr or Hf;

each $R^1$ is independently hydrogen or alkyl or two adjacent $R^1$ form an aromatic ring;

each $R^2$, $R^3$ and $R^4$ is independently alkyl, cycloalkyl, phenyl, optionally substituted phenyl, alkphenyl or optionally substituted alkphenyl; and each $R^5$ is independently alkyl, cycloalkyl, aryl, optionally substituted aryl, arylalkyl or optionally substituted arylalkyl;

with the proviso that $R^2$ and $R^3$ are not the same.

In a preferred embodiment, M is Zr. Preferably, each $R^1$ is the same and is hydrogen or alkyl; more preferably, each $R^1$ is hydrogen; more preferably, each $R^1$ is methyl. Preferably, each $R^5$ is alkyl, cycloalkyl, optionally substituted phenyl or optionally substituted benzyl; more preferably, each $R^5$ is alkyl; most preferably, each $R^5$ is methyl.

As used herein, "alkyl" refers to straight- or branched-chain hydrocarbons having from 1 to 10 carbon atoms and more preferably 1 to 8 carbon atoms, including by way of example methyl, ethyl, propyl, i-propyl and t-butyl.

"Aryl" by itself or as part of another group refers to monocyclic, bicyclic or tricyclic aromatic groups containing 6 to 14 carbon atoms in the ring position. Useful aryl groups include $C_{6-14}$ aryl, preferably $C_{6-10}$ aryl. Typical $C_{6-14}$ aryl groups include phenyl, napthyl, indenyl, phenanthrenyl, anthracenyl, fluorenyl and biphenyl groups.

"Optionally substituted aryl" refers to an aryl group, wherein the aryl ring or rings may contain 1 to 5 electron donating or electron withdrawing groups. By way of example, electron donating groups include, but are not limited to amino, hydroxy, alkoxy, amide, aryl and alkyl. Examples of electron withdrawing groups include, but are not limited to, halo, ketone, ester, —$SO_3H$, aldehyde, carboxylic acid, cyano, nitro and ammonium.

"Optionally substituted Si(aryl)$_3$" refers to a tri-arylsilyl group, wherein each aryl, independently, is optionally substituted aryl.

"Arylalkyl" refers to an alkyl group mentioned above substituted by a single aryl group including, by way of example, benzyl, phenethyl and napthylmethyl.

"Optionally substituted arylalkyl" refers to an arylalkyl group, wherein the arylalkyl ring or rings may contain 1 to 5 electron donating or electron withdrawing groups. By way of example, electron donating groups include, but are not limited to amino, hydroxy, alkoxy, amide, aryl and alkyl. Examples of electron withdrawing groups include, but are not limited to, halo, ketone, ester, —$SO_3H$, aldehyde, carboxylic acid, cyano, nitro and ammonium.

"Alkylarylalkyl" refers to an alkyl group mentioned above substituted by a single aryl group, wherein the aryl group is further substituted by one or more alkyl groups. Examples include, without limitation, 4-methylbenzyl and 4-ethylphenethyl.

"Cycloalkyl" refers to cyclic alkyl groups containing between 3 and 8 carbon atoms having a single cyclic ring including, by way of example, cyclopropyl, cyclobutyl, cyclopentyl, cyclooctyl and the like.

"Optionally substituted phenyl" refers to a phenyl ring which may contain 1 to 5 electron donating or electron withdrawing groups. By way of example, electron donating groups include, but are not limited to amino, hydroxy, alkoxy, amide, aryl and alkyl. Examples of electron withdrawing groups include, but are not limited to, halo, ketone, ester, —$SO_3H$, aldehyde, carboxylic acid, cyano, nitro and ammonium.

"Alkphenyl" refers to an alkyl group mentioned above substituted by a single phenyl group including, by way of example, benzyl, 1-phenethyl, 1-phenylpropyl, 1-phenylbutyl, 2-phenethyl, 2-phenylpropyl, 2-phenylbutyl, 3-phenylpropyl and 3-phenylbutyl.

"Optionally substituted alkphenyl" refers to an alkphenyl group, wherein the phenyl ring may contain 1 to 5 electron donating or electron withdrawing groups. By way of example, electron donating groups include, but are not limited to amino, hydroxy, alkoxy, amide, aryl and alkyl. Examples of electron withdrawing groups include, but are not limited to, halo, ketone, ester, —$SO_3H$, aldehyde, carboxylic acid, cyano, nitro and ammonium.

"Halo" refers to fluoro, chloro, bromo and iodo.

"Aromatic ring" refers to an unsaturated carbocyclic group of 6 to 14 carbon atoms having a single ring (e.g., phenyl) or multiple condensed rings (e.g., naphthyl or anthryl).

As used herein, the term "polyolefin" comprises olefin homopolymers, co-polymers and block copolymers.

Activated olefin polymerization catalysts that contain an enantiomeric excess of one enantiomer or that are substantially enantiopure may also be prepared from the precatalyst (I). Such optically active catalysts allow one to control the absolute handedness of the polyolefins and block co-polymers of the invention. In this embodiment, the precatalyst (I) contains one or more optically active substituents, i.e., those containing chiral centers of absolute configuration, at R, $R^1$, $R^2$, $R^3$ and $R^4$. Examples of such optically active precatalysts include those having Formulae (II) and (III):

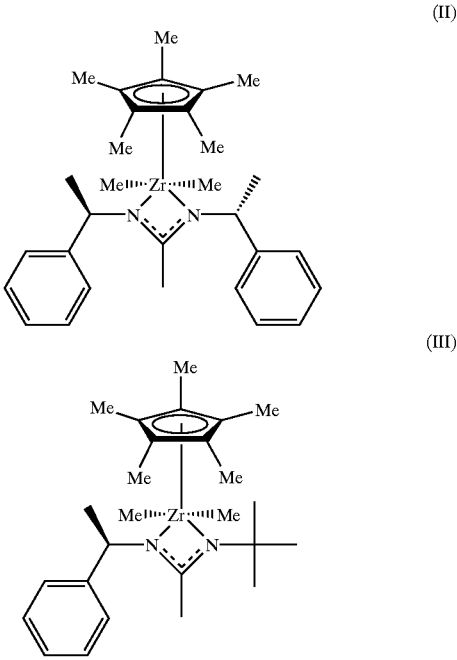

In order to prepare such optically active precatalysts, one may using a chiral ligand, resolve the diasteriomers, and then remove the ligand to generate the optically active precatalyst. An example of such a chiral ligand is (R,R)-binaphtholate of Formula (IV) that can be removed by methylation to produce optically active (I):

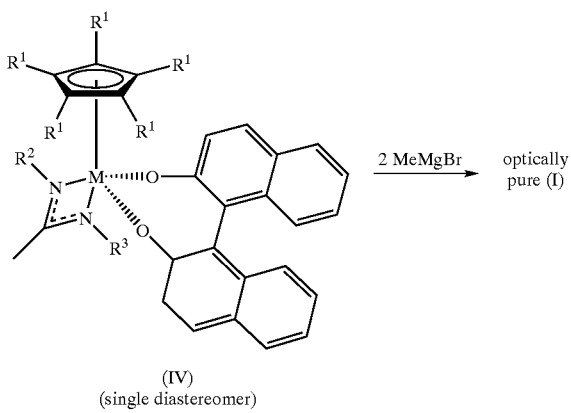

(IV)
(single diastereomer)

One may employ an "ansa" bridge to ensure configurational stability of the zirconium center after optical resolution. An example of one such precatalyst is provided by (V):

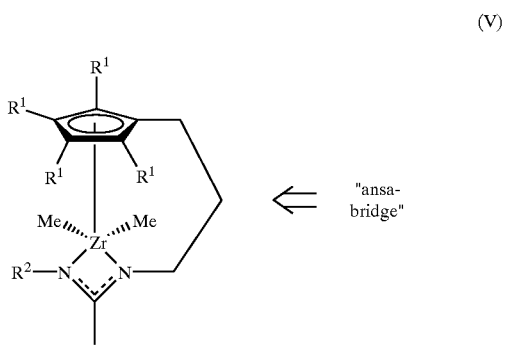

Alternatively, one may add a chiral σ-donor, such as a tertiary amine, that will resolve, in-situ, the catalyst derived from I (generated upon addition of co-catalyst). An example of such a σ-donor is provided by VI:

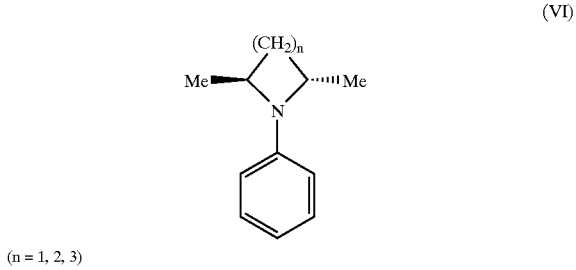

(n = 1, 2, 3)

The olefin polymerization pre-catalyst of the present invention may be prepared using any suitable olefin polymerization catalyst precursor. The olefin polymerization catalyst precursor may be made by any means available; the method of synthesis of the olefin polymerization catalyst precursor is not critical to the invention.

The olefin polymerization pre-catalyst of the present invention is converted to an activated olefin polymerization catalyst by using an activating co-catalyst. The activated olefin polymerization catalyst of the present invention thus produced is useful in the polymerization of a variety of α-olefins in a stereospecific and living fashion. For example, 1-hexene and vinylcyclohexane are polymerized by an activated olefin polymerization catalyst of the present invention to give a highly isotactic and high molecular weight material. In addition, the same catalyst polymerizes 1-hexene and vinylcyclohexane in a living fashion. Other α-olefins that may be polymerized with a catalyst of the present invention include, but are not limited to γ-substituted alpha olefins such as 3-methylbutene, 3-methyl-1-pentene, vinylcyclohexene, vinylcyclobutane, vinylcyclopentane, vinylcyclooctane, 1-decene and enantiomerically pure β-citronellene.

The activating co-catalyst is capable of generating the activated olefin polymerization catalyst. Preferably, the activating co-catalyst is one of the following: (a) ionic salts of the general formula $[A^+][^-BR^6_4]$, wherein $A^+$ is a cationic Lewis or Brønsted acid capable of abstracting a methyl from the olefin polymerization pre-catalyst, B is the element boron, and $R^6$ is phenyl or an optionally substituted phenyl or (b) a boron alkyl of the general formula $BR^6_3$.

Examples of Lewis or Brønsted acids that may be used in the practice of the invention include, but are not limited to tetra-n-butylammonium, triphenylcarbonium and dimethylanilinium cations.

The mole ratio of olefin polymerization pre-catalyst to activating co-catalyst usefully employed in the olefin polymerization catalyst composition may vary. When the activating co-catalyst is an ionic salt of the formula $[A^+][^-BR^6_4]$, or a boron alkyl of the formula $BR^6_3$, the mole ratio of boron atoms contained in the ionic salt or the boron alkyl to total metal atoms contained in the olefin polymerization pre-catalyst is generally in the range of from about 0.9:1 to about 1.5:1, preferably in the range of from about 1:1 to about 1.1:1.

Reaction of the olefin polymerization pre-catalyst with the activating co-catalyst may typically take place within about 10 seconds to about 30 minutes, most preferably within about 1 to about 10 minutes, at temperatures of about −35 to about 25° C., preferably about −10 to about 0° C.

Particularly preferred is an olefin polymerization catalyst composition that is in unsupported, liquid form. For example, the polymerization catalyst composition may be introduced into the reaction zone in unsupported, liquid form as described in U.S. Pat. No. 5,317,036. As used herein, "unsupported, liquid form" includes liquid olefin polymerization pre-catalyst, liquid co-catalyst, solution(s) or dispersions thereof in the same or different solvent(s) (e.g., chlorobenzene, isopentane, hexane, toluene, or the like), and combinations thereof. Unsupported, liquid form catalyst compositions have a number of practical benefits. Unsupported catalyst compositions avoid the costs associated with support material and its preparation, and provide for the realization of a very high catalyst surface area to volume ratio. Furthermore, unsupported catalyst compositions produce polymers having a much lower residual ash content than polymers produced using supported catalyst compositions.

The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are chlorobenzene, dichlorobenzene, isopentane, hexane, cyclohexane, heptane, benzene, toluene, trifluorotoluene, pentane, octane, isooctane, dichloromethane and the like. Reactive contact between the olefin monomer and the catalyst composition should be maintained by constant stirring or agitation. The reaction medium containing the olefin polymer product and unreacted olefin monomer may be withdrawn from the reactor continuously. The olefin polymer product may be separated, and the unreacted olefin monomer and liquid reaction medium may be recycled into the reactor.

U.S. Pat. No. 5,912,202 teaches that polymerization may be carried out in a single reactor or in two or more reactors in series, and is conducted substantially in the absence of catalyst poisons. According to U.S. Pat. No. 5,681,908 catalyst poisons may include water, oxygen, carbon dioxide, hydrogen, sulfur and acetylene. U.S. Pat. No. 5,674,795 teaches that even minor amounts (i.e., $\leqq 2$ ppm) of such materials have been found to affect the polymerization adversely. According to the present invention, organometallic compounds may be employed as scavenging agents for poisons and to increase the catalyst activity. Examples of scavenging agents are metal alkyls, preferably aluminum alkyls, most preferably triisobutylaluminum.

Conventional adjuvants may be included in the process, provided they do not interfere with the operation of the activated olefin polymerization catalyst composition in forming the desired polyolefin. Hydrogen or a metal or non-metal hydride, e.g., a silyl hydride, may be used as a chain transfer agent in the process.

Polyolefins that may be produced according to the invention include, but are not limited to, those made from olefin monomers such as ethylene and linear or branched higher α-olefin monomers containing 3 to about 20 carbon atoms. Homopolymers, co-polymers or block co-polymers of ethylene and such higher alpha-olefin monomers, with densities ranging from about 0.86 to about 0.95 may be made. In addition, homopolymers, co-polymers and block co-polymers that have high isotacticity and low polydispersities may be made. For example, high isotacticity, as determined using the pentad level of analysis, is from about 90 to 100 percent, preferably from about 97 to 100 percent. See Asakura et al., *Macromolecules* 24:2334–2340 (1991). Low polydispersity is, for example, from about 1.01 to 2.0. Suitable higher alpha-olefin monomers include, for example, propylene, 1-butene, 1-pentene, 1-hexene, 4-methyl-1-pentene, 1-octene, 3,5,5-trimethyl-1-hexene, vinylcyclohexane, 3-methylbutene, 3-methyl-1-pentene, vinylcyclobutane, vinylcyclopentane, vinylcyclooctane, 1-decene and enantiomerically pure β-citronellene. Olefin polymers according to the invention may also be based on or contain conjugated or non-conjugated dienes, such as linear, branched, or cyclic hydrocarbon dienes having from about 4 to about 20, preferably 4 to 12, carbon atoms. Nonconjugated Dienes include those of general structure (VII):

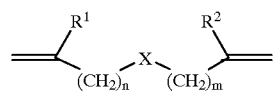

(VII)

where:
$R^1=R^2$ or $R^1 \neq R^2$=H, alkyl, phenyl, heteroatom;
n=m or n≠m=0, 1, 2, . . . ;
X=CH$_2$ or heteroatom, or Y(R$^3$,R$^4$) where R$^3$=R$^4$ or R$^3$≠R$^4$=H, alkyl, phenyl, heteroatom; and
Y=C, N, P, B, Al, Si, Ge, Sn, but not so limited.

Preferred dienes include 1,4-pentadiene, 1,5-hexadiene, 5-vinyl-2-norbornene, 1,7-octadiene, vinylcyclohexene, dicyclopentadiene, butadiene, isobutylene, isoprene, ethylidene norbornene and the like. Aromatic compounds having vinyl unsaturation such as styrene and substituted styrenes, vinyl trialkyl silanes and the like may be polymerized according to the invention as well. Specific polyolefins that may be made according to the invention include, for example, poly-1-hexene, polyvinylcyclohexane, 1-hexene/vinylcyclohexane block co-polymers, polyethylene, polypropylene, ethylene/propylene rubbers (EPR's), ethylene/propylene/diene terpolymers (EPDM's), polybutadiene, polyisoprene and the like, as well as a variety of di- and ter-block co-polymers.

Having now generally described this invention, the same will be understood by reference to the following examples which are provided herein for purposes of illustration only and are not intended to be limiting unless otherwise specified.

EXAMPLE 1

Synthesis and Evaluation of Activated Olefin Polymerization Catalysts 1 & 2

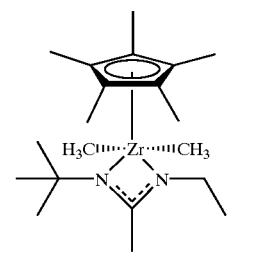

1

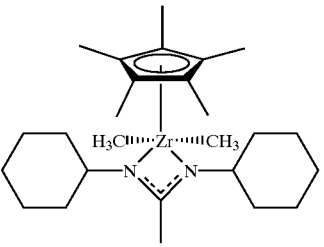

2

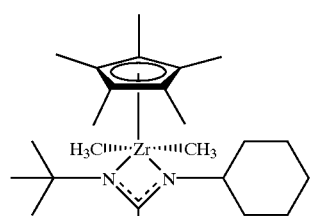

3

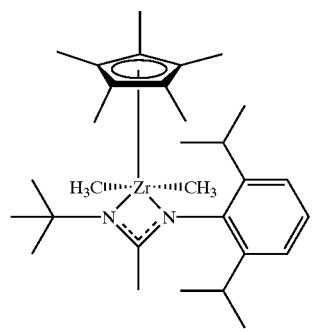

4

Dry, oxygen-free solvents and standard Schlenk line and glovebox techniques were used throughout. Chlorobenzene was distilled from calcium hydride. Pentane, diethyl ether and tetrahydrofuran were distilled from sodium/benzophenone ketyl. 1-Hexene (>99%, Aldrich) was distilled from sodium/potassium alloy. GC analysis of the 1-hexene confirmed that its isomeric purity was greater than 99%. Dicyclohexylcarbodiimide, 1-t-butyl, 3-ethylcarbodiimide and [PhNMe$_2$H][B(C$_6$F$_5$)$_4$] (Strem) were obtained from commercial sources and used as obtained.

A. Synthesis of Olefin Polymerization Pre-catalyst 1.

To a solution of 0.5 g (1.84 mmol) of Cp*ZrMe$_3$ (Cp*= 1,2,3,4,5-pentamethylcyclopentadienyl anion) in 10 ml of pentane, a solution of 0.23 g (1.84 mmol) of 1-t-butyl, 3-ethylcarbodiimide in 10 ml of pentane was added and the mixture stirred at room temperature for 18 h. Upon removal of the volatiles in vacuo, the crude material was recrystallized from pentane at −35° C. to provide the desired compound 1 in a 71% yield as a white crystalline material. For 1: $^1$H NMR (400 MHZ, benzene-d$_6$) δ0.23 (s, 6H), 0.90 (t, 3H, J=7.2 Hz), 1.16 (s, 9H), 1.70 (s, 3H), 2.01 (s, 15H), 2.86 (q, 2H, J=7.2 Hz). Anal. Calcd. for C$_{20}$H$_{38}$N$_2$Zr: C, 60.39; H, 9.63; N, 7.04. Found: C, 60.54; H, 9.61; N, 7.03.

B. Synthesis of Olefin Polymerization Pre-catalyst 2.

Compound 2 was prepared in a similar fashion. For 2 (68% yield): $^1$H NMR (400 MHZ, benzene-d$_6$) δ0.34 (s, 6H), 1.11 (m, 6H), 1.48 (m, 6H), 1.68 (s, 3H), 1.73 (m, 8H), 2.04 (s, 15H), 2.95 (tt, 2H, J=3.6 Hz, J=11.5 Hz). Anal. Calcd. for C$_{26}$H$_{46}$N$_2$Zr: C, 65.35; H, 9.70; N, 5.86. Found: C, 64.97; H, 9.67; N, 6.02.

C. General Polymerization Procedure (either 2 M or 32 M, in 1-hexene).

The activated olefin polymerization catalyst was prepared by adding a solution of 25 μmol of either 1 or 2 in 4 ml of chlorobenzene, precooled to −35° C., to a solution of 25 μmol of [PhNMe$_2$H][B(C$_6$F$_5$)$_4$] in 4 ml of chlorobenzene also precooled to −35° C. After 10 min at −35° C., the bright yellow activated olefin polymerization catalyst solution was brought to the polymerization temperature whereupon 2 ml of 1-hexene, precooled to the polymerization temperature, was added rapidly and all at once via cannula. At the desired time, the polymerization was quenched by the addition of acidified (HCl) methanol and the volatiles removed in vacuo (~0.01 mm Hg). Purification of the polymer was achieved by precipitation of a toluene solution into a large volume of methanol, collecting the solid material and drying it overnight at 60° C. and 0.01 mm Hg. The yields and GPC analyses of the purified polymers revealed no significant changes from those of the crude materials. For polymerizations that are 32 M in 1-hexene, the catalyst was prepared in only 2 ml of chlorobenzene in the same fashion as above, and then 8 ml of 1-hexene, precooled to the polymerization temperature, was added all at once.

For kinetic analysis of the polymerizations, a weighed amount of undecane was used as an internal standard. Aliquots were then drawn at measured time intervals and the percent conversion of the monomer determined by GC analysis.

D. Polymer Characterization

GPC analyses were performed using a Waters GPC system equipped with a column oven and differential refractometer both maintained at 35° C. and four columns (Waters Ultrastyragel 500 Å, Waters Styragel HR3, Waters Styragel HR4 and Shodex K-806M) also maintained at 35° C. THF was used as the eluant at a flow rate of 1.1 ml/min. $M_n$ and $M_w/M_n$ values were obtained using the Waters GPC software and seven different polystyrene standards (Polymer Laboratories).

E. Evaluation of Olefin Polymerization Pre-catalysts 1 and 2

Prior studies with compounds closely related to 1–4 have provided only disappointing results with respect to the Ziegler-Natta polymerization of either ethene or propene. Sita and Babcock, *Organometallics* 17:5228–5230 (1998); Buijink et al., *Naturforsch.* 46B:1328–1332 (1991); Chernega et al., *J. Chem. Soc., Chem. Commun.* 1415–1417 (1993); Gomez et al., *J. Chem. Soc., Chem. Commun.* 2607–2608 (1994); Gomez et al., *J. Organometal. Chem.* 491:153–158 (1995). As Table 1 shows, however, upon activation with the borate, [PhNMe$_2$H][B(C$_6$F$_5$)$_4$], compound 2 surprisingly proved to be capable of functioning as a competent activated olefin polymerization catalyst for the polymerization of 1-hexene at 0° C. in chlorobenzene. Importantly, the narrow polydispersity (monomodal, $M_w/M_n$=1.10), and the lack of olefinic resonances in both the $^1$H and $^{13}$C NMR spectra of the poly(1-hexene) formed, strongly suggested a living character for this polymerization process that is devoid of termination via β-hydride elimination. Babu et al., *Macromolecules* 27:3383–3388 (1994). However, as FIG. 1A reveals, the $^{13}$C NMR spectrum of this material also clearly pointed to a lack of stereocontrol of polymer microstructure with this particular system. Babu et al., *Macromolecules* 27:3383–3388 (1994); Asakura et al., *Macromolecules* 24:2334–2340 (1991).

Given the promising results with 2, and those of Ewen and co-workers who were able to produce highly isotactic polypropylene from the chiral C$_I$ symmetric metallocene, Me$_2$C(3-t-Bu-C$_5$H$_3$)(9-fluorenyl)ZrCl$_2$, it was of interest to determine if the racemic compounds 1, 3 and 4, could serve in a similar capacity. Ewen, *J. Mol. Catal. A: Chem.* 128:103–109 and references cited therein (1998). In this regard, while compounds 3 and 4 exhibited dramatically reduced activity, with only oligomers being produced under identical conditions as a possible result of too much steric hindrance imposed by these particular acetamidinate substituents, 1 proved to be an exceptional olefin polymerization pre-catalyst for the polymerization of 1-hexene with respect to providing both a higher activity and a higher molecular weight for the poly(1-hexene) formed when the process was started at room temperature (see Table 1, entry 1). Inspection of the $^{13}$C NMR spectrum for this material also revealed it to be highly isotactic (mmmm>95%). Indeed, the only indication that these conditions were potentially non-ideal for both the stereospecific, and living, polymerization of 1-hexene was provided by the broader polydispersity index ($M_w/M_n$) of 1.50 that was obtained for this poly(1-hexene). However, when the polymerization was performed with 1 at lower temperature, both an increase in the molecular weights and a decrease in the polydispersities of the poly(1-hexene)s produced was observed while the relatively high activities were maintained (Table 1, entries 2 and 3). Most significantly, the high molecular weight poly (1-hexene) obtained at −10° C. had a polydispersity of only 1.03, thereby indicating that this polymerization was living. As the $^{13}$C NMR spectrum shown in FIG. 1B reveals the polymerization was stereospecific for the formation of isotactic material (mmmm>95%). Additional proof for the living character of the polymerization of 1-hexene conducted under these last conditions was provided by a plot of the number-average molecular weight, $M_n$, of the poly(1-hexene) produced vs. the extent of monomer consumed which yielded a linear correlation as shown in FIG. 2. Finally, it was shown by one polymerization experiment (initial conditions: 180 equiv. of 1-hexene; 50 μmol of activated 1 in chlorobenzene, −10° C., total reaction volume, 10 ml) that the polymer formed ($M_n$=20,732, $M_w/M_n$=1.03) after complete consumption of the monomer (t=60 min) was still living by the formation of a higher molecular weight polymer ($M_n$=35,372, $M_w/M_n$=1.13) upon introduction of another 180 equiv. of 1-hexene and carrying out the polymerization for an additional 40 min.

TABLE 1

1-Hexene Polymerization Data

| Entry | Pre-catalyst[a] | [H][b] (M) | Temp. (° C.) | Time (min) | Activity[c] | $M_n$[d] | $M_w/M_n$ |
|---|---|---|---|---|---|---|---|
| 1 | 1 | 32 | 25[a] | 15 | 110 | 32,572 | 1.50 |
| 2 | " | 2 | 0 | 15 | 76 | 43,544 | 1.23 |
| 3 | " | 2 | −10 | 15 | 64 | 49,251 | 1.03 |
| 4 | " | " | " | 30 | N/A | 69,544 | 1.10 |
| 5 | 2 | 32 | 0 | 30 | 9 | 11,032 | 1.10 |

[a]Prepared from equimolar (25 μmol) amounts of the zirconium complex (i.e., olefin polymerization pre-catalyst) and [PhNMe$_2$H][B(C$_6$F$_5$)$_4$] in chlorobenzene; total reaction volume, 10 ml.
[b][H] = [1-hexene]
[c]$g_{polymer} \cdot mmol_{cat}^{-1} \cdot h^{-1}$
[d]Determined by GPC analysis at 35° C. using polystyrene standards and THF as the eluant.
[e]Exotherm observed for polymerization initiated at this temperature.

EXAMPLE 2

Polymerization of Vinylcyclohexane to Give Isotactic Polyvinylcyclohexane (iso-PVCH)

The activated olefin polymerization catalyst was prepared in a glove box by adding a solution of 25 mmol (10 mg) of compound 1 in 1 ml of chlorobenzene, precooled to −35° C., to a solution of 25 mmol (20mg) of [PhNMe$_2$H][B(C$_6$F$_5$)$_4$] in 1 ml of chlorobenzene, also precooled to −35° C. 8 ml of vinylcyclohexane was then added to the yellow activated olefin polymerization catalyst solution at room temperature and the resulting mixture stirred for 15 min, after which time, the polymerization was quenched by the addition of methanol and the volatiles removed in vacuo (0.01 mm Hg). The solid material was dried overnight at 100° C./0.01 mm Hg to yield 0.37 g of the polymer (activity: 60 kg$_{polymer}$mol$_{cat}^{-1}$h$^{-1}$).

EXAMPLE 3

Polymerization of Vinylcyclohexane and 1-hexene to Give an Isotactic Block Co-polymer The activated olefin polymerization catalyst was prepared in a glove box by adding a solution of 25 mmol (10 mg) of compound 1 in 2.22 ml of chlorobenzene, precooled to −10° C., to a solution of 25 mmol (20 mg) of [PhNMe$_2$H][B(C$_6$F$_5$)$_4$] in 2.22 ml of chlorobenzene also precooled to −10° C. 0.56 ml (0.38 g) of 1-hexene, which was precooled to −10° C., was added to the yellow activated olefin polymerization catalyst solution and the reaction was stirred for 1 h at −10° C. After 1 h, 6 ml of vinylcyclohexane was added all at once to the reaction mixture which was then warmed to room temperature and stirred for 1 h. The polymerization was then quenched by the addition of methanol and the volatiles removed in vacuo (0.01 mm Hg). The solid material was dried overnight at 100° C./0.01 mm Hg to yield 1.2 g of the polymer.

EXAMPLE 4

Cyclopolymerization of 1,5-hexadiene and Preparation of Block Co-polymers

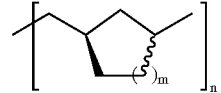

Poly(methylene-1,3-cycloalkanes) (5) (m=1, 2, 3, . . . ), which can be prepared through the cyclopolymerization of nonconjugated dienes using homogeneous Ziegler-Natta catalysts (Resconit, L. and Waymouth, R. M., *J. Am. Chem. Soc.* 112:4953–4954 (1990); Kesti, M. R., et al., *J. Am. Chem. Soc.* 114:9679–9680 (1992); Coates, G. W. and Waymouth, R. M., *J. Am. Chem. Soc.* 113:6270–6271 (1991); Kesti, M. R. and Waymouth, R. M., *J. Am. Chem. Soc.* 114:3565–3567 (1992); Coates, G. W. and Waymouth, R. M., *J. Am. Chem. Soc.* 115:91–98 (1993); Cavallo, L., et al., *Macromolecules* 26:260–267 (1993); Schaverien, C. J., *Organometallics* 13:69–82 (1994); de Ballesteros, O. R., et al., *Macromolecules* 28:2383–2388 (1995); Naga, N., et al., *Macromol. Chem. Phys.* 200:1466–1472 (1999)), are attractive for incorporation in block co-polymers since the degree of crystallanity of these materials can be tuned by varying the cis/trans ratio of the backbone ring structures through variations in catalyst structure (Cavallo, L., et al., *Macromolecules* 26:260–267 (1993)). Fortunately, as Table 2 shows, active catalysts prepared from equimolar amounts of 1–3 and ([PhNMe$_2$H][B(C$_6$F$_5$)$_4$] in chlorobenzene at −10° C. are effective for the production of high molecular weight poly(methylene-1,3-cyclopentane)(PMCP) materials possessing extremely narrow polydispersities ($M_w/M_n$<1.1). Both the absence of $^1$H NMR (500 MHz) resonances for olefinic end groups that might arise through β-hydride elimination and the highly linear relationship found in a kinetic analysis [i.e., In ([M$_o$]/[M$_t$]) vs time] employing 1 can be taken as evidence that these cyclopolymerizations are proceeding in a living fashion (Szware, M., and van Beylen, M., *Ionic Polymerization and Living Polymers*, Chapman & Hall, New York, N.Y. (1993); Quirk, R. P. and Lee, B., *Polym. Int.* 27:359–367 (1992); Matyjaszewski, K., *J. Phys. Org. Chem* 81:197–207 (1995)). Not surprisingly, polymerization activity is attenuated as the steric bulk of the amidinate substituents in 1–3 increases (see Table 2).

TABLE 2

Representative Cyclopolymerizations of 1,5-Hexadiene and Syntheses of iso-Poly(1-hexane)/PMCP Block Co-polymers[a]

| entry | pre-catalyst | H[b] | HD[b] | H | $M_n$[c] | Mw/$M_n$[c] | trans (%)[d] | $T_m$ (° C.)[e] |
|---|---|---|---|---|---|---|---|---|
| 1 | 1 | | 188 (60) | | 20 000 | 1.09 | 64 | 98 |
| 2 | 2 | | 774 (60)[f] | | 25 000 | 1.04 | 78 | 99 |

TABLE 2-continued

Representative Cyclopolymerizations of 1,5-Hexadiene and
Syntheses of iso-Poly(1-hexane)/PMCP Block Co-polymers[a]

| entry | pre-catalyst | H[b] | HD[b] | H | $M_n$[c] | Mw/$M_n$[c] | trans (%)[d] | $T_m$ (° C.)[e] |
|---|---|---|---|---|---|---|---|---|
| 3 | 3 | | 710 (225)[f] | | 14 000 | 1.03 | 82 | 100 |
| 4 | 1 | 89 (90) | | | 12 200 | 1.03 | | nd |
| 5 | 1 | 89 (90) | 89 (90) | | 22 800 | 1.05 | | 91 |
| 6 | 1 | 77 (90) | 77 (90) | 77 (90) | 30 900 | 1.10 | | 79 |

[a]Polymerizations were conducted at −10° C. in chlorobenzene using equimolar (25 µmol) amounts of the precatalyst and [PhNMe$_2$H][B(C$_6$F$_5$)$_4$] as a co-catalyst; total reaction volume, 5 mL except for entry 6 which employed 50 µmol each of precatalyst and co-catalyst and a total reaction volume of 10 mL.
[b]Values correspond to the number of monomer equivalents and those in parentheses to polymerization times in minutes.
[c]Determined by GPC analysis at 35° C. using polystyrene standards and THF as the eluant.
[d]Determined from $^{13}$C NMR spectra by relative integration of 4,5-trans and 4,5-cis resonances. (Coates, G. W., and Waymouth, R. M., J. Am. Chem. Soc. 115:91–98 (1993); Cheng, H. N., and Khasat, N. P., J. Appl. Polym. Sci. 35:825–829 (1988).
[e]From differential scanning calorimetry (second scan).
[f]Polymerizations not taken to complete monomer conversion.

With respect to the PMCP microstructures that are obtained with 1–3, all catalysts were found to be at least 98% selective (or 100% in the case of 3) for cyclopolymerization over linear 1,2-insertion of 1,5-hexadiene. As Table 2 further indicates, while all catalysts were selective for trans ring formation, trans content was found to increase with an increase in the steric bulk of the amidinate moiety. Furthermore, the structure of the catalyst was found to greatly influence the isotactic content of the PCMP, with the highest degree of isoselectivity being observed for 1 (see FIGS. 3A–3C) (Coates, G. W. and Waymouth, R. M., J. Am. Chem. Soc. 115:91–98 (1993); Cheng, H. N. and Khasat, N. P., J. Appl. Polym. Sci. 35:825–829 (1988)).

Additional support that cyclopolymerizations of 1,5-hexadiene were occurring in a living fashion was provided by the successful synthesis of iso-poly(1-hexane)/PMCP di- and triblock co-polymers of narrow polydispersity (see Table 2). In each case, GPC traces of the resulting polymers were monomodal after each addition of monomer, and they shifted to higher molecular weights that were consistent with block lengths predicted assuming complete consumption of monomer in each case. High-field $^{13}$C NMR spectra of these new block co-polymers consisted of simple superpositions of the individual resonances for the iso-poly(1-hexane) (Jayaratne, K. C., and Sita, L. R., J. Am. Chem. Soc. 122:958–959 (2000)) and PMCP homopolymers, but most significantly, they revealed that both block materials were highly isotactic as expected and that the integrated ratios of the resonances for the two types of blocks remained the same before, and after, purification of the polymeric material through precipitation.

Final proof that the new block co-polymers of Table 2 were truly of a block nature was provided by ps-tm AFM imaging of thin polymer films of the triblock material (entry 6) (van Dijk, M. A., and van den Berg, R., Macromolecules 28:6773–6778 (1995); Stocker, W., et al., Macromolecules 29:7502–7507 (1996)). After annealing a 220 nm thick film of this co-polymer at 120° C. (10$^{-3}$ Torr) for 36 h, both the height and phase maps provided by ps-tm-AFM clearly revealed that the material had microphase-separated into a cylindrical morphology consisting of hard (dark) cylinders of PMCP (8±1 nm in width) running parallel to the surface and surrounded by the more elastic (light) poly(1-hexane) domains (12±1 nm in width). The occurrence of micrometer-scale depressions seen in the final surface structure that have a uniform depth of 15±2 nm provides evidence that this cylindrical phase is further quantized with respect to film thickness as previously encountered with other triblock materials (Bates, F. S., Science 251:898–905 (1991); Hamley, I. W., The physics of Block Co-polymers, Oxford University Press, New York, N.Y. (1988); van Dijk, M. A., and van den Berg, R., Macromolecules 28:6773–6778 (1995); Stocker, W., et al., Macromolecules 29:7502–7507 (1996); Leclere, P., et al., Langmuir 12:4317–4320 (1996)).

EXAMPLE 4

Synthesis of ($\eta^5$-C$_5$H$_5$)Zr(Me$_2$)[N(Cy)C(Me)N(Cy)]

($\eta^5$-C$_5$H$_5$)ZrCl$_3$ (0.50 g, 1.9 mmol) in 50 mL of Et$_2$O was cooled to −65° C. and 5.9 mmol of MeLi in 25 mL of Et$_2$O was added via a cannula. The mixture was stirred for 1 h at −65° C. and quenched with excess TMSCl. 1,3-Dicyclohexylcarbodiimide (0.31 g, 1.5 mmol) in 25 mL of Et$_2$O was added via a cannula at −65° C. The mixture was allowed to warm up to −20° C. in 1 h 30 min and the reaction flask was taken out of the cold bath and was stirred for 30 min at room temperature. The solvent was removed in vacuo and the residue was extracted with pentane. Cooling a pentane solution to −30° C. afforded the product as a white crystalline solid. (0.60 g, 77% yield). Anal. Calcd. for C$_{21}$H$_{36}$N$_2$Zr: C, 61.86, H, 8.90, N, 6.87. Found: C, 61.56, H, 8.96, N, 6.77. $^1$H NMR (400 MHz, 25° C., C$_6$D$_6$): δ0.54 (s, 6H), 1.20 (m, 10H), 1.51 (s, 3H), 1.53 (m, 6H), 1.66 (m, 4H), 2.85 (tt, 2H, J$^1$=3.6 Hz, J$^2$=11.5 Hz), 6.30 (s, 5H).

From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety.

What is claimed is:

1. An olefin polymerization pre-catalyst of the formula:

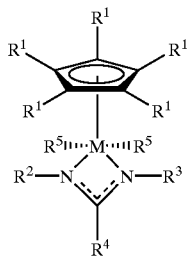

(I)

wherein the dotted lines indicate a delocalized bond;
M is Zr or Hf;
each $R^1$ is independently hydrogen or alkyl or two adjacent $R^1$ form an aromatic ring;
each $R^2$, $R^3$ and $R^4$ is independently alkyl, cycloalkyl, phenyl, optionally substituted phenyl or alkphenyl; and
each $R^5$ independently is alkyl, cycloalkyl, aryl, optionally substituted aryl, arylalkyl or optionally substituted arylalkyl;
with the proviso that $R^2$ and $R^3$ are not the same.

2. The pre-catalyst of claim 1, wherein M is Zr.

3. The pre-catalyst of claim 1, wherein each $R^1$ is hydrogen.

4. The pre-catalyst of claim 1, wherein each $R^1$ is methyl.

5. The pre-catalyst of claim 1, wherein each of $R^2$ and $R^3$ is independently selected from the group consisting of ethyl, t-butyl, cyclohexyl, 1-phenyl-ethyl and 2,6-di(t-propyl) phenyl.

6. The pre-catalyst of claim 5, wherein said pre-catalyst is selected from the list consisting of:

($\eta^5$-C$_5$(CH$_3$)$_5$)Zr(CH$_3$)$_2$-N-(1-phenylethyl)-N'-(t-butyl) acetamidinate;

($\eta^5$-C$_5$(CH$_3$)$_5$)Zr(CH$_3$)$_2$-N-(t-butyl)-N'-(ethyl) acetamidinate;

($\eta^5$-C$_5$(CH$_3$)$_5$)Zr(CH$_3$)$_2$-N-(t-butyl)-N'-(cyclohexyl) acetamidinate; and ($\eta^5$-C$_5$(CH$_3$)$_5$)Zr(CH$_3$)$_2$-N-(t-butyl)-N'-(2,6-di(i-propyl) phenyl)acetamidinate.

7. The pre-catalyst of claim 1, wherein each $R^5$ is methyl.

* * * * *